May 10, 1966 N. J. KAZYK ETAL 3,251,012

TUNING APPARATUS WITH DETACHABLE F.M. SECTION

Filed March 23, 1964

INVENTORS.
Norbert J. Kazyk
Frank R. Mikuls
By: Mueller & Aichele
Att'ys.

United States Patent Office 3,251,012
Patented May 10, 1966

3,251,012
TUNING APPARATUS WITH DETACHABLE F.M. SECTION

Norbert J. Kazyk, Norridge, and Frank R. Mikuls, Bensenville, Ill., assignors to Motorola, Inc., Chicago, Ill., a corporation of Illinois Filed Mar. 23, 1964, Ser. No. 353,969
2 Claims. (Cl. 334—1)

This invention relates to radio receivers, and more particularly to a pushbutton operable tuner for a radio receiver adapted for A.M. and F.M. reception.

Certain automobile users find it desirable to be able to receive both amplitude modulated (A.M.) broadcasts and frequency modulated (F.M.) broadcasts with their automobile radio receivers. Other automobile users do not wish to assume the cost of an A.M. and F.M. receiver and obtain only an A.M. receiver. When a different tuner construction is used for each type of receiver, manufacturing costs are compounded due to production, installation, and inventory problems. Furthermore, if the owner of an automobile desires F.M. reception some time after initially purchasing a receiver equipped for only A.M. reception, he must often replace his entire unit.

A solution to the above difficulties is to provide a tuner which is adapted for both A.M. and F.M. reception in all radio receivers manufactured. Such a practice, however, adds to the cost of the basic receiver, forcing the consumer who does not desire F.M. reception to pay for additional equipment. An alternative solution is to add a separate F.M. tuner in the event F.M. reception is desired. The added tuner, however, may require more space than is available in the automobile, or may occupy so much space as to be unsightly or inconvenient.

Accordingly, it is an object of this invention to provide an improved tuner for a radio receiver adapted for A.M. and F.M. reception.

Another object of the invention is to provide a radio receiver for an automobile having an A.M. tuner which may be readily modified for F.M. reception while occupying a minimum of additional space.

Still another object of the invention is to provide a radio receiver and A.M. tuner adapted for the addition of F.M. reception thereto, and wherein the cost of the basic radio receiver unit is minimized.

A still further object of the invention is to provide a radio receiver wherein both F.M. and A.M. tuning may be accomplished automatically through the use of pushbuttons.

A feature of the invention is the provision of a pair of frame structures, one mounted upwardly and rearwardly of the other and each carrying a horizontally disposed row of coils for F.M. and A.M. tuning, respectively, and a single core carriage mechanism for moving cores in all said coils.

Another feature of the invention is the provision of an F.M. tuner coil section removably mounted rearwardly and upwardly of the A.M. tuner coil section and having linearly displaceable cores therein connected to the same core carriage as the cores for the A.M. section.

Still another feature of the invention is the provision of a pushbutton operable tuner having an A.M. coil section, and a frame mounted rearwardly and upwardly of the A.M. coil section, which frame carries a printed circuit board having a horizontally disposed row of coils thereon for F.M. tuning.

A further feature is the provision of a tuner as described above wherein the F.M. coils are offset from A.M. coils to conserve space and shorten the connecting rods.

Figures 1, 2:
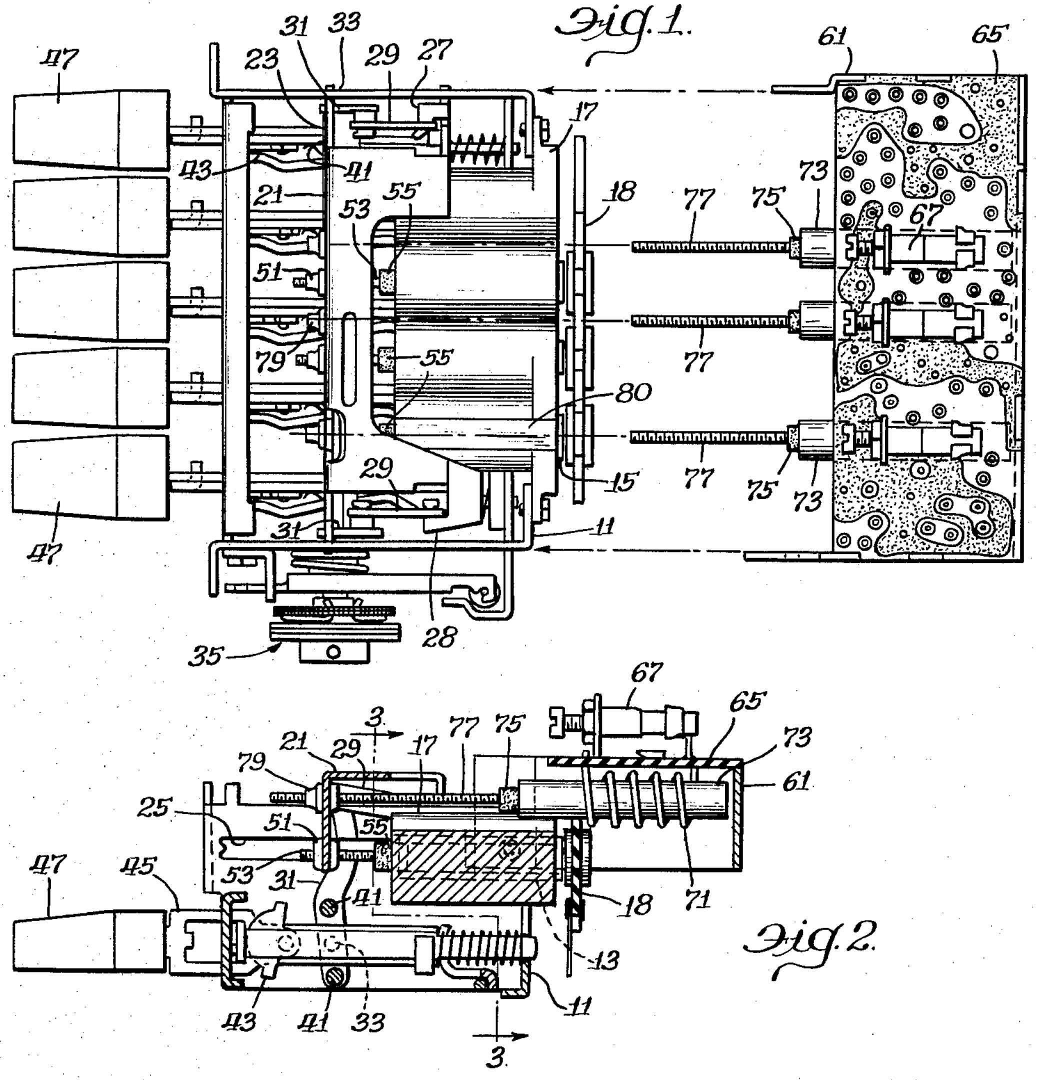
FIG. 1 is a top plan view partially exploded of a tuner constructed in accordance with the invention.
FIG. 2 is a side elevational half section view of the tuner.

In accordance with the invention, a tuner for a radio receiver adapted for F.M. and A.M. reception includes a first structure having a horizontally disposed row of coils for A.M. tuning. Core members for tuning the coils in the row are connected to a linearly displaceable tuning carriage for moving the cores in the A.M. coils. A second structure is disposed upwardly and rearwardly of the first structure and is removably secured thereto and supported thereby. The second structure carries a second horizontally disposed row of coils for F.M. tuning. These latter coils are also tuned by a plurality of core members connected to the tuning carriage to be displaced thereby.

In one form of the invention, the first and second structures may be supporting frames for the tuning elements, and the core carriage may be selectively displaced either by a plurality of manually actuable pushbuttons or by a manually actuable rotary tuning drive. The second structure may include a printed circuit panel disposed across its frame to carry a plurality of circuit elements and the row of coils associated with the F.M. tuning. The F.M. coils may be offset from the A.M. coils to conserve space.

Referring now more particularly to the drawings, a tuner constructed in accordance with the invention is shown. The tuner includes a first frame 11, which carries a plurality of coils 13 for A.M. tuning. Coils 13 are wound on coil forms 15 which are secured inside the coil supporting structure 17 of cast metal, and to a terminal board 18.

A tuning carriage 21, is slidably supported by fingers 23 extending into guide slots 25 in the sides of frame 11. Turning carriage 21 has a pair of extensions 27 and 28 at either side thereof connected through pivotal links 29 to levers 31. Levers 31 are pivotally mounted at 33 to the sides of frame 11. One of levers 31 is driven through a gear and clutch assembly 35, which may be driven in a conventional manner through a manually operable rotary tuning drive.

Levers 31 are connected by a pair of treadle bars 41 extending across the tuner on either side of pivots 33. Treadle bars 41 are engageable by each of a plurality of presettable cams 43 on pushbutton actuable slide members 45 when the respective pushbuttons 47 are depressed. Upon depression of a pushbutton 47, treadle bars 41 will align themselves with the face of the preset cam associated with the one of slides 45 controlled by the depressed pushbutton. This displaces tuning carriage 21 to a predetermined position, as is well known in the art.

Tuning carriage 21 carries a plurality of internally threaded sockets 51, in which are threaded rods 53. The other end of rods 53 carry the tuning slugs or cores 55 for respective ones of coils 13. When tuning carriage 21 is moved, the position of cores 55 in coils 13 will be changed to tune the receiver to different frequencies for A.M. reception.

As previously discussed, it is desirable to be able to readily modify an A.M. tuner for F.M. reception. In the tuner of the invention, this may be accomplished by adding a second frame 61 removably secured by means of screws 63 to frame 11 rearwardly and upwardly thereof. Frame 61 carries a circuit board 65, which may be a printed or laminated circuit board, for supporting the various components of the F.M. tuner section. As shown in the drawings, circuit board 65 carries a plurality of adjustable capacitors 67 for adjusting the tuning of the F.M. portion of the radio receiver to its optimum condition. A plurality of coils 71 are suspended from circuit board 65 on the underside thereof inside wrap-around frame 61 and about coil forms 73. Cores 75 are disposed inside the cylindrical coil forms 73 for tuning coils 71 for F.M. reception in the receiver. Cores 75 are connected through threaded rods 77 which extend over coils 13 to sockets 79, disposed in tuning carriage 21 above sockets 51. Accordingly, movement of tuning carriage 21 will not only adjust the position of cores 55 in coils 13 for A.M. tuning, but will also adjust the position of cores 75 in coils 73 for F.M. tuning.

Figure 3:
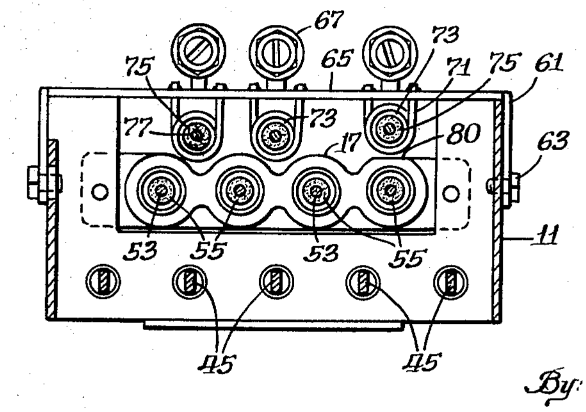
FIG. 3 is a sectional view taken along the line 3—3 of FIG. 2.

The F.M. coils 71 may be offset from coils 13 as may be seen by the two furthest left coils 71 in FIG. 3. This conserves vertical space while maintaining minimum length in rods 77. If too much mutual inductance exists, coils 71 may have to be set further apart as is the furthest right coil 71 in FIG. 3. If such is the case, a flat 80 may be provided in structure 17, and the coil may be mounted closer to board 65.

As a result of utilizing a tuner constructed in accordance with the invention, only one basic tuner need be manufactured, greatly reducing manufacturing costs. In addition, very little additional space is required for the additional F.M. portion, facilitating later modification of existing A.M. tuners. Additional F.M. circuitry will, of course, have to be incorporated in the receiver circuitry, not shown, for F.M. reception. Switching may be provided in the receiver circuitry, to which circuitry for F.M. reception is added, so that tuning coils 13 and 73 may be selectively switched into and out of the receiver circuitry, depending on whether A.M. or F.M. reception is desired.

The pushbutton slides 44 may be adjusted to preset the cams 43 for all A.M. tuning, or all F.M. tuning, or a mixture of both. Threaded rods 77 and 53 may be made flexible for shock absorption, and sockets 79 and 51 may be of resilient plastic for minimization of backlash. When the coil support structure 17 is cast in a shape such as is shown in FIG. 3, it will be seen that slight depressions are left on the upper surface thereof. Proper placement of coils 71 and circuit board 65 will permit the coils to be disposed in these depressions to further minimize the vertical dimension of the tuner.

It may therefore be seen that the invention provides an improved tuner for A.M. and F.M. radio receivers. The F.M. section of the tuner may be readily added or removed and occupies a minimum of space. The tuner may be operated by presettable pushbutton mechanisms in the tuner, or through conventional manual knob operation.

We claim:

1. A tuner for a radio receiver adapted for A.M. and F.M. reception including in combination, a first frame, a first horizontally disposed row of coils for A.M. tuning secured to said first frame, a tuning carriage slidably mounted on said first frame, actuating means for linearly displacing said tuning carriage, a plurality of first core members connected to said tuning carriage to be displaced thereby, said first core members being disposed in said coils in said first row for tuning the same according to the position of said tuning carriage, a second frame removably secured to said first frame rearwardly and upwardly thereof, a printed circuit board secured to said second frame, at least one adjustable capacitor and a second horizontally disposed row of coils for F.M. tuning secured to said printed circuit board, said coils of said second row being parallel to each other and parallel to said coils of said first row, and a plurality of second core members connected to said tuning carriage to be displaced thereby, said second core members being disposed in said coils in said second row for tuning the same according to the position of said tuning carriage, whereby displacement of said tuning carriage by said actuating means will tune the receiver for both A.M. and F.M. reception.

2. A tuner for a radio receiver adapted for A.M. and F.M. reception including in combination, a first frame, a first horizontally disposed row of coils for A.M. tuning mounted to said first frame, a tuning carriage slidably mounted on said frame in front of said first row, actuating means for linearly displacing said tuning carriage, said actuating means comprising a plurality of pushbutton elements and further comprising a manually operable rotary mechanism, a plurality of first core members connected to said carriage to be displaced thereby, said first core members being disposed in said coils in said first row for tuning the same according to the position of said tuning carriage, an add-on F.M. tuner including a second frame removably secured to said first frame rearwardly and upwardly thereof, a printed circuit board mounted to said second frame, a plurality of circuit elements mounted to said circuit board including a plurality of adjustable capacitors and a second horizontally disposed row of coils for F.M. tuning, a plurality of second core members, and means positioned above said first row of coils connecting said second core members to said tuning carriage to be displaced thereby, said second core members being disposed in said coils in said second row for tuning the same according to the position of said tuning carriage, whereby displacement of said tuning carriage by said actuating means will tune the receiver for both A.M. and F.M. reception.

References Cited by the Examiner

UNITED STATES PATENTS

| | | | |
|---|---|---|---|
| 2,158,252 | 5/1939 | Polydoroff | 336—136 |
| 2,424,506 | 7/1947 | Sands | 334—77 |
| 2,503,220 | 4/1950 | Schaper | 334—77 |
| 2,581,966 | 1/1952 | Mitchell | 334—70 |
| 3,163,837 | 12/1964 | Teaf | 334—77 |

HERMAN KARL SAALBACH, *Primary Examiner.*

R. F. HUNT, *Assistant Examiner.*